United States Patent [19]

Turner et al.

[11] Patent Number: 5,349,388
[45] Date of Patent: Sep. 20, 1994

[54] VIDEO SIGNAL GENERATING APPARATUS

[75] Inventors: Alan Turner; Mukesh Chouhan, both of Basingstoke; David J. Hedley, Winchester, all of England

[73] Assignee: Sony United Kingdom Limited, Staines, United Kingdom

[21] Appl. No.: 32,108

[22] Filed: Mar. 17, 1993

[30] Foreign Application Priority Data

Mar. 27, 1992 [GB] United Kingdom .............. 9206708.1

[51] Int. Cl.$^5$ ...................... H04N 5/262; H04N 5/272
[52] U.S. Cl. .................................. 348/590; 348/593; 348/594
[58] Field of Search ............. 358/10, 139, 22, 160, 358/183, 182, 150; 324/76 R, 77 R; 328/187, 188; 364/579, 580; H04N 5/262, 5/272, 17/00, 17/02

[56] References Cited

U.S. PATENT DOCUMENTS 4,466,014 8/1984 Wilensky et al. .................. 358/139
4,538,268 8/1985 Pham Van Cang .................. 358/10
4,554,663 11/1985 Pham van Cang .................. 358/10
4,635,096 1/1987 Morgan .............................. 358/139
4,910,681 3/1990 Ohtake et al. ...................... 358/10

FOREIGN PATENT DOCUMENTS 0260658 3/1988 European Pat. Off. .
2023963 1/1980 United Kingdom .
2219170 11/1989 United Kingdom .

Primary Examiner—James J. Groody
Assistant Examiner—Michael H. Lee
Attorney, Agent, or Firm—William S. Frommer; Alvin Sinderbrand

[57] ABSTRACT

A video signal generating apparatus comprises a first microprocessor (10) including a memory (16) for receiving and storing in non-real time instructions for the generation of a range of video signals, such as test patterns, digital multi-effect keys or wipe patterns for a digital switcher, and a second microprocessor (14) for reading the instructions and generating a selected required video signal in real time.

7 Claims, 5 Drawing Sheets

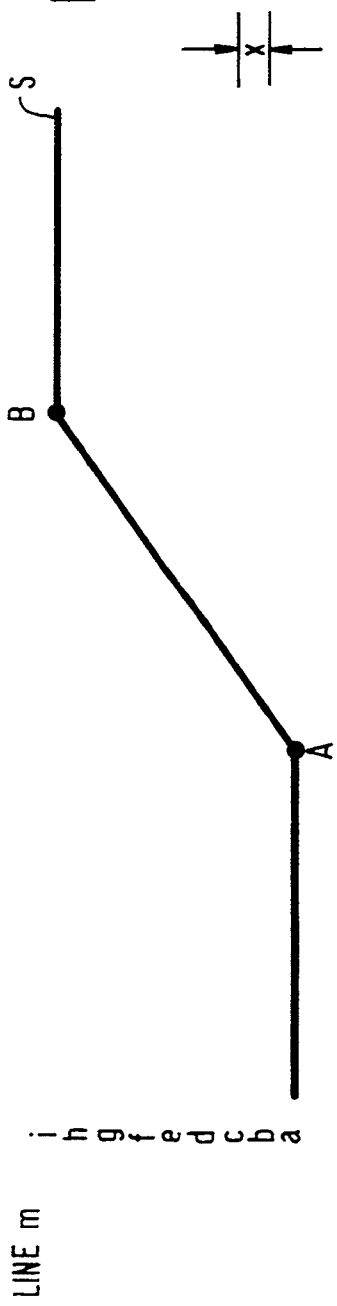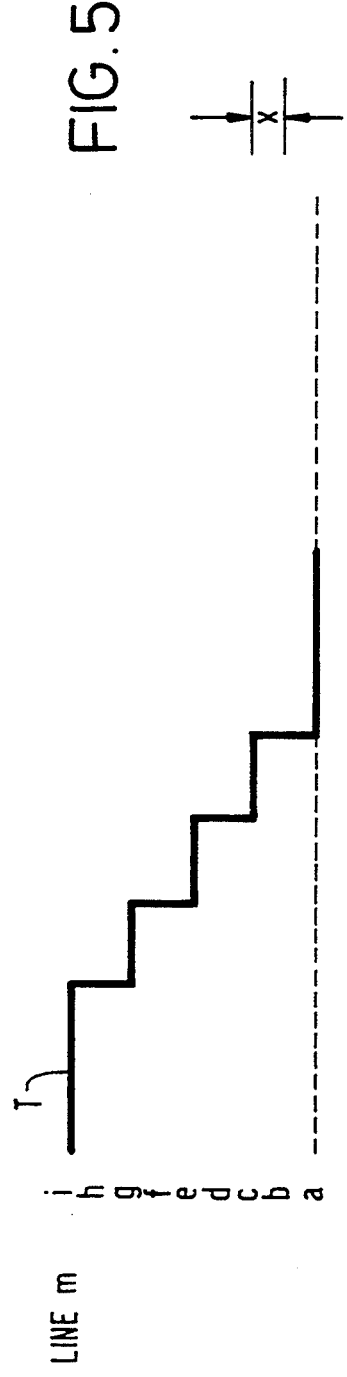

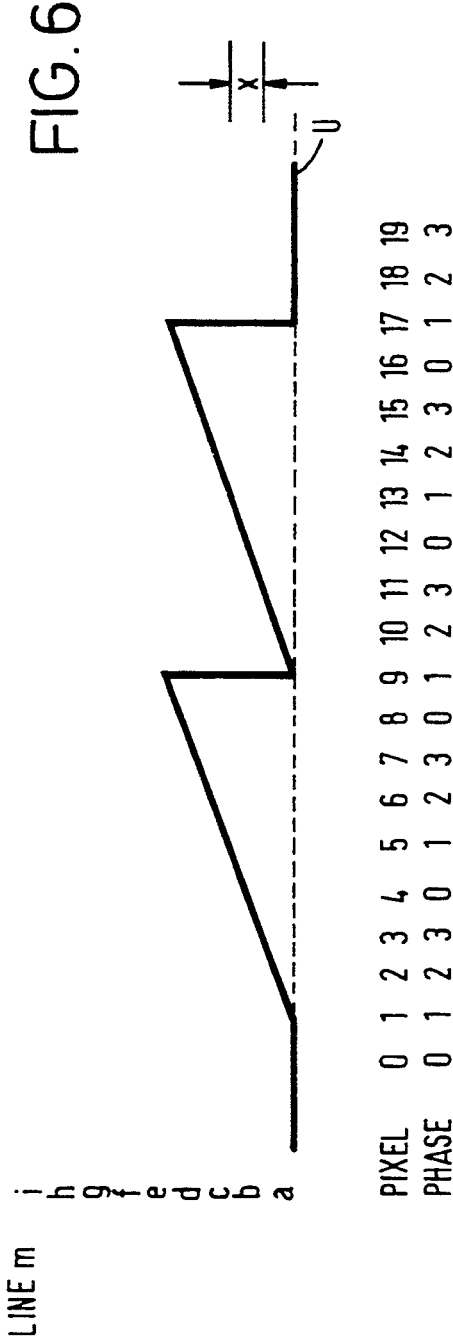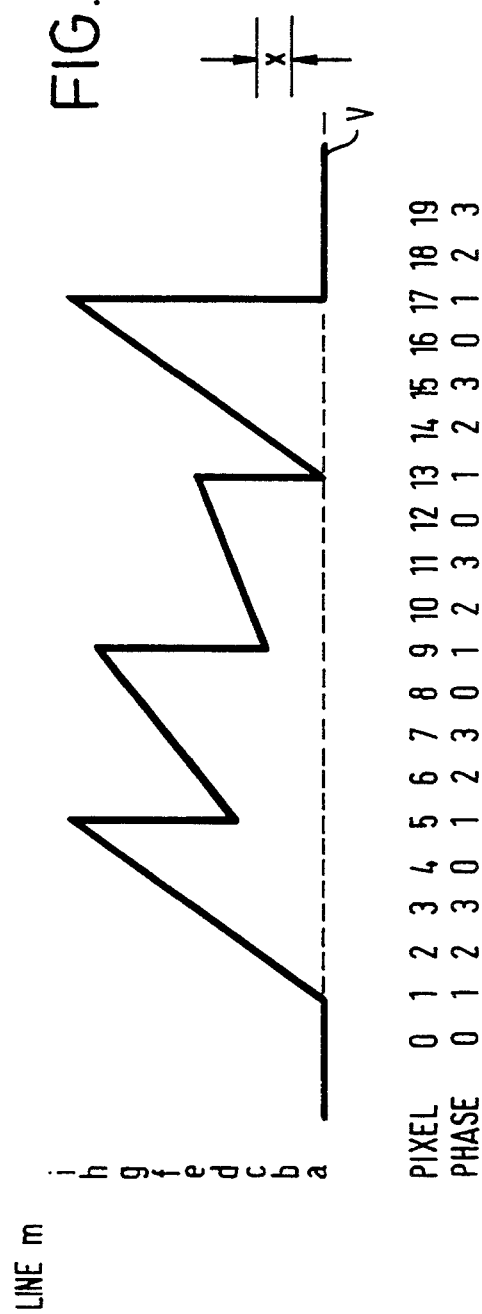

VIDEO SIGNAL GENERATING APPARATUS

BACKGROUND OF THE INVENTION

1. Field of the Invention

This invention relates to video signal generating apparatus.

2. Description of the Prior Art

In complex digital video processing systems which are currently being developed, there is a requirement to generate various video signals such as test patterns, digital multi-effects (DME) keys and wipe patterns for digital switchers. Such video signals have a wide range of complexity, but to provide apparatus to generate even the simplest signals may require a considerable amount of hardware design; while it may be impractical to provide apparatus to generate more complex signals, due to constraints on equipment size or cost. Consequently implementations are usually compromised, resulting in inflexibility or apparatus of limited application.

OBJECTS AND SUMMARY OF THE INVENTION

An object of the invention is to overcome at least partially the problems of the prior art set out hereinabove.

Another object of the invention is to provide apparatus for generating a range of video signals in real time.

According to one aspect of the invention there is provided a video signal generating apparatus comprising a first microprocessor including a memory for receiving and storing in non-real time instructions for the generation of a range of video signals. The apparatus further comprises a second microprocessor for reading the instructions and generating a selected required video signal in real time.

Preferably, the video signals comprise test patterns, digital multi-effect keys and wipe patterns for digital switchers.

According to another aspect of the invention there is provided a video signal generating apparatus having input means for inputting data relating to a video signal to be generated and representing signal pixel start addresses, signal start levels at the signal start addresses, and signal increment values. A plural number of adder means add modification levels to the signal start levels for respective video outputs. Start value modification control means generates the modification levels corresponding in number to the number of adder means. Accumulator means accumulates the output signals of the adder means from the signal start addresses in dependence on the signal increment values, so as to generate demultiplexed video signals. The demultiplexed signals are then combined to generate the video signal.

An embodiment of the invention described below provides video signal generating apparatus having advantages in flexibility, cost and power consumption over known apparatus. The embodiment takes advantage of the feature that the required signal is defined in a concise manner, so that storage thereof is simple and generation is broken down into a series of primitive operations thereby providing high flexibility.

BRIEF DESCRIPTION OF THE DRAWINGS

The above and other objects, features and advantages of the invention will be apparent from the following detailed description of an illustrative embodiment thereof, which is to be read in conjunction with the accompanying drawings, in which like references indicate like items throughout, and in which:

FIGS. 4 to 7 are schematic diagrams for explaining the operation of the embodiment of FIG. 1.

DESCRIPTION OF THE PREFERRED EMBODIMENT

Figure 1:
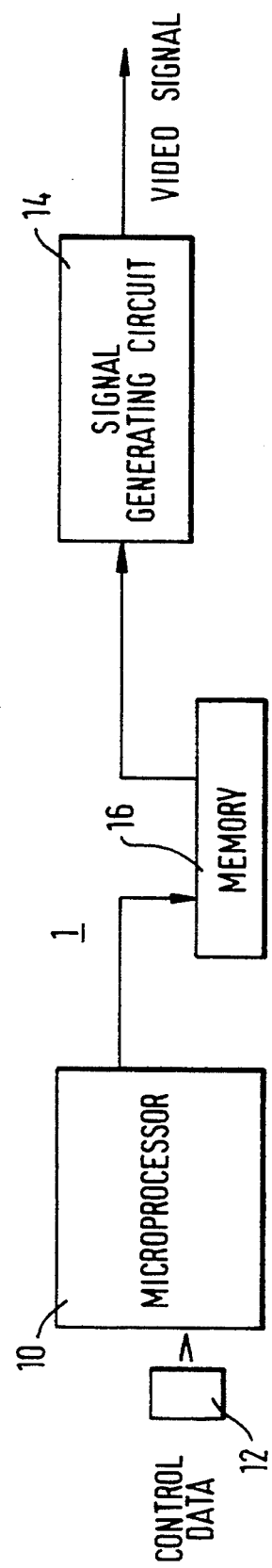
FIG. 1 is a block diagram of one embodiment of video signal generating apparatus according to the present invention.

Referring initially to FIG. 1, there is shown a video signal generating apparatus 1 embodying the invention. Control data are supplied to a controlling microprocessor 10 through a control interface 12 in non-real time. The control data relates to a required high definition video signal to be generated, which may, for example, be a ramp signal, a color bar signal, some other test signal, a DME key or a wipe pattern. The controlling microprocessor 10 calculates the necessary data for the required video signal to be generated in dependence on the control data, the necessary data being, in the case of a ramp signal, line address data, pixel address data, ramp increment data, ramp start data, ramp up/down data and 5-bit, for example, control data relating to every video field or frame of the required video signals. These data are written in a common memory 16 in the controlling microprocessor 10. These data for a field/frame (N) are computed during the preceding field/frame (N−1) and supplied to a further microprocessor forming a signal generating circuit 14. These data for the field/frame (N) are then processed by the signal generating circuit 14 during the field/frame (N) to generate the required video signal.

Figure 2:
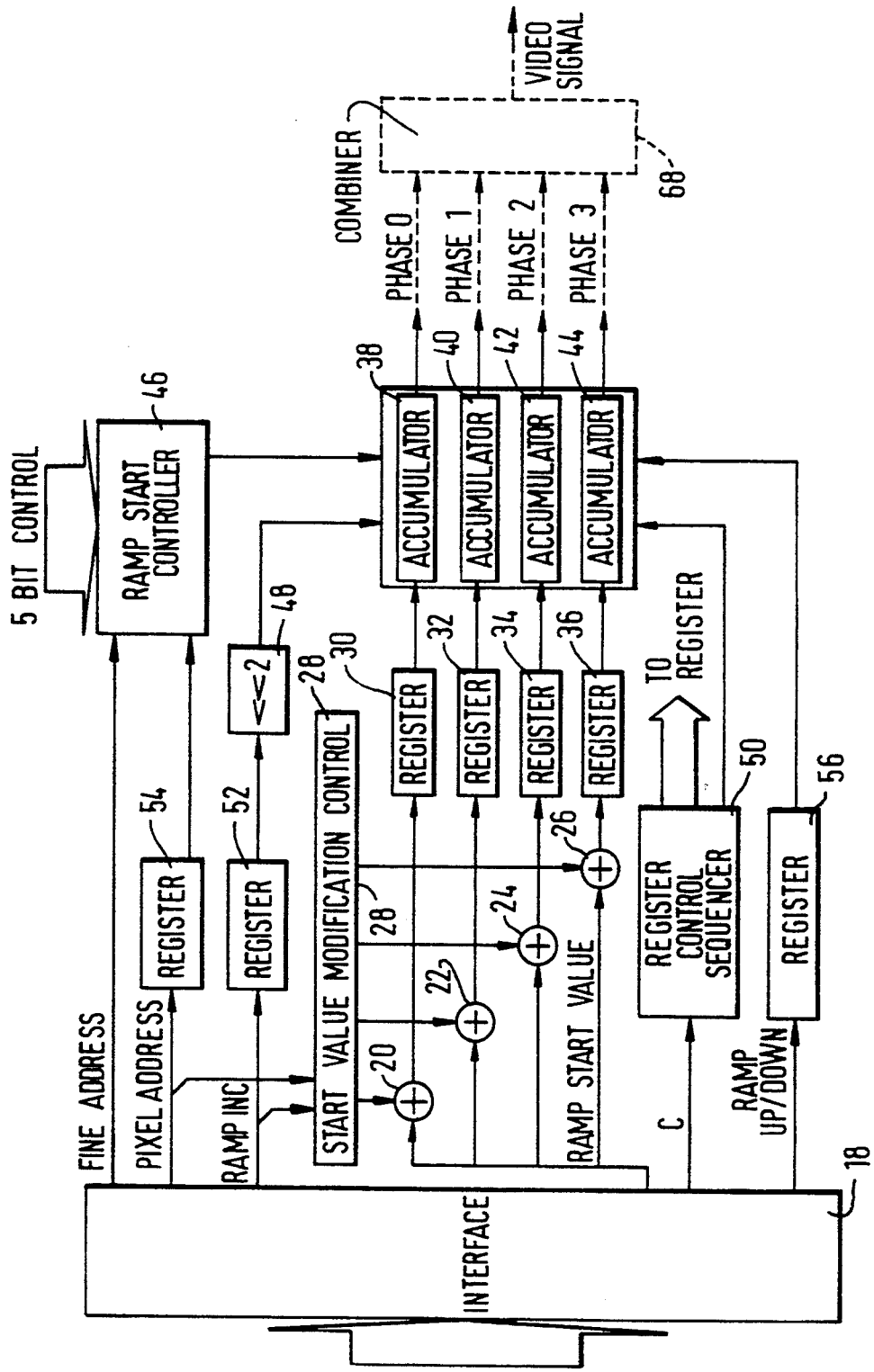
FIG. 2 is a block diagram of a signal generating circuit in FIG. 1.

The signal generating circuit 14 is as shown in FIG. 2, and comprises an interface 18 which receives the line address data, the pixel address data, the ramp increment data, the ramp start data, the ramp up/down data and the 5-bit control data from the memory 16. A first adder 20, a second adder 22, a third adder 24 and a fourth adder 26 are provided, to which the ramp start data from the interface 18 and an output signal of a start value modification control means 28 are supplied. Each adder 20, 22, 24 and 26 adds the output signal from the start value modification control means 28 to the ramp start data and supplies the added data to registers 30, 32, 34 and 36, respectively.

Accumulators 38, 40, 42 and 44 are provided, to which output signals from the registers 30, 32, 34 and 36 are supplied. Each accumulator 38, 40, 42 and 44 accumulates the output signal from the register 30, 32, 34 or 36 under control of a ramp start controller a bit shift controller 48, a register control sequencer 50 and the ramp up/down data. Each accumulator 38, 40, 42 and 44 outputs demultiplexed phase 0 data, phase 1 data, phase 2 data and phase 3 data of the ramp signal to be generated. A first signal path comprises the adder 20, the register 30 and the accumulator 38. A second signal path comprises the adder 22, the register 32 and the accumulator 40. A third signal path comprises the adder 24, the register 34 and the accumulator 42. A fourth signal path comprises the adder 26, the register 36 and the accumulator 44.

The start value modification control means 28 generates offset data for the first, Second, third and fourth signal paths according to the pixel address data and the ramp increment data from the interface 18, and supplies these offset data to the adders 20, 22, 24 and 26.

The bit shift controller 48 multiplies the ramp increment data received from the interface 18 through a register 52 by four, by shifting the bits of the ramp increment signal, and supplies a multiplied ramp increment signal to the accumulators 38, 40, 42 and 44, so as to control the gradient of the ramp signal to be generated.

The ramp start controller 46 is a counter which is reset at the beginning of each video field/frame in dependence on a field/frame based control signal. Then the ramp start controller 46 counts scan lines and pixels. The ramp start controller 46 controls the accumulators 38, 40, 42 and 44 in order that the ramp start data are loaded from the registers 30, 32, 34 and 36 into the accumulators 38, 40, 42 and 44 when the count value equals the line address and pixel address designated. On the next clock cycle, the accumulators 38, 40, 42 and 44 begin to add the multiplied ramp increment signal from the bit shift controller 48 to the output signals from the registers 30, 32, 34 and 36 to generate a ramp signal. The ramp start controller 46 controls the accumulators 38, 40, 42 and 44 in order that next ramp start values are loaded from the register 30, 32, 34 and 36 into the accumulators 38, 40, 42 and 44 when the count value equals the next pixel address memorized in a register 54. Then the accumulators 38, 40, 42 and 44 begin to add the next multiplied ramp increment signal from the bit shift controller 48 to the next output signal from the registers 30, 32, 34 and 36 to generate the next ramp signal. If the ramp value reaches the maximum (for example, white) or minimum (for example, black level) allowed value, the accumulation operation ends.

Ramp up/down data from the interface 18 are supplied to the accumulators 38, 40, 42 and 44 through a register 56. The accumulating direction of the accumulators 38, 40, 42 and 44 is controlled according to the ramp up/down data. If the accumulation direction is the up direction, then the gradient of the generated ramp signal is positive. On the other hand, if the accumulation direction is the down direction, then the gradient of the generated ramp signal is negative.

A signal indicating all the data necessary to specify a ramp signal is supplied to the register control sequencer 50. The register control sequencer 50 controls the registers 30, 32, 34, 36, 52, 54 and 56, so that the data necessary to specify a ramp signal are sequentially memorized in the registers 30, 32, 54, 36, 52, 54 and 56, and are sequentially read out therefrom in dependence on that signal. Each register 30, 32, 34, 36, 52, 54 and 56 may be a first-in-first-out memory.

Figure 3:
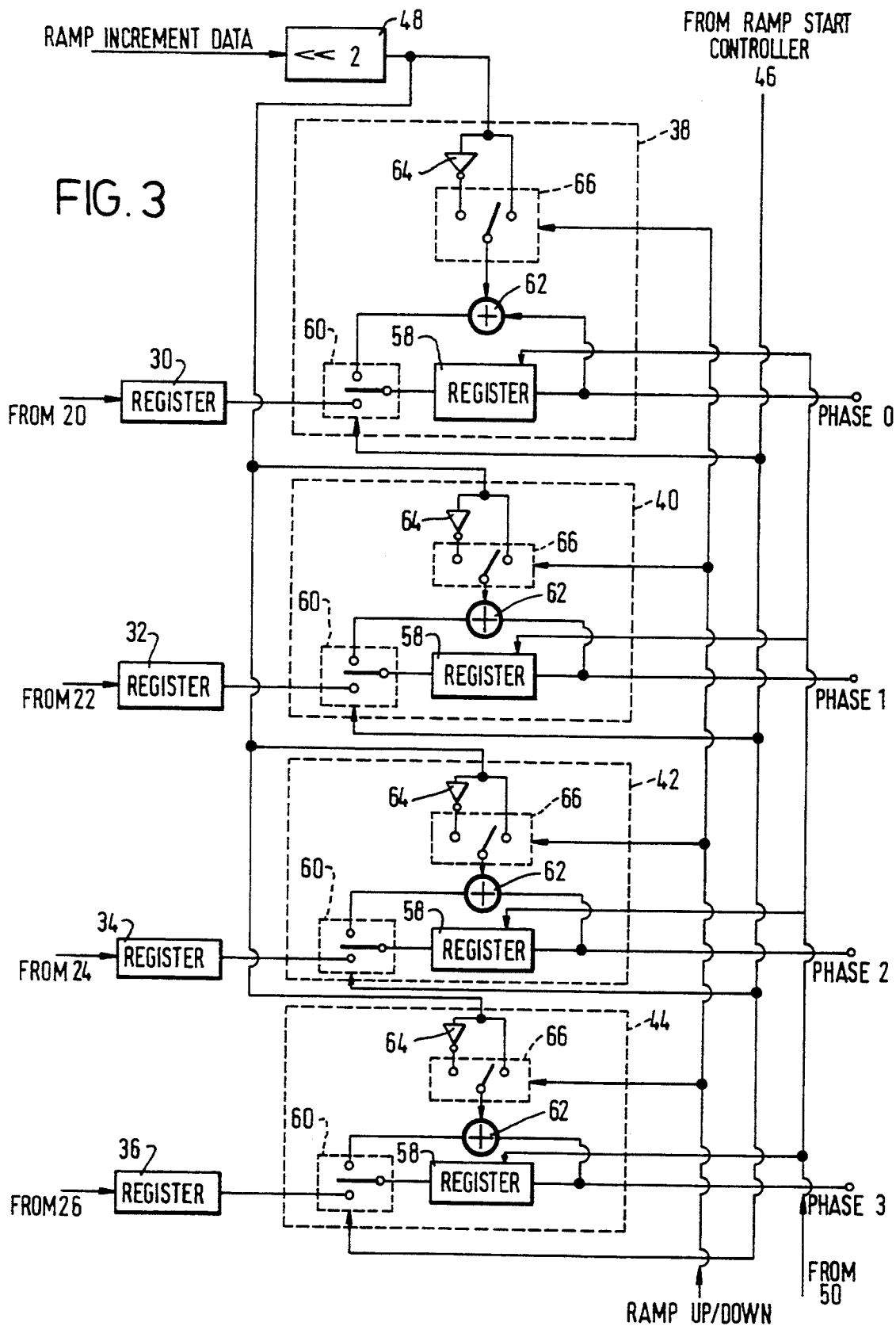
FIG. 3 is a block diagram of an accumulator in FIG. 2.

Referring to FIG. 3, the accumulators 38, 40, 42 and 44 will be explained. Since they are all the same, only the accumulator 38 will be explained here. There is provided a register 58 which receives the output signal from a switch 60. The switch 60 selectively supplies an output signal from the register 30 and an adder 62 to the register 58 in dependence on an output signal from the ramp start controller 46. There is provided a inverting means 64 which takes the 2's complement of the output signal from the bit shift controller 48. A switch 66 selectively supplies an output signal from the bit shift controller 48 and an output signal from the inverting means 64 to the adder 62 in dependence on the ramp up/down signal. The adder 62 adds the output signal from the switch 66 to the output signal from the register 58. The operation of the register 58 is controlled by the register control sequencer 50. The signal memorized in the register 58 is supplied as the phase 0 output signal.

The operation of the ramp signal generating apparatus will now be described with reference to FIG. 4.

In FIG. 4, a solid line S is a ramp signal to be generated at video line m. In this case, the operator inputs a first set of data, namely, the video line address 'm', the ramp start value 'a', the ramp start pixel address '6', the ramp increment data 'x', and a second set of data, namely, the video line address 'm', the ramp end value 'i', the ramp end pixel address '14', and the subsequent ramp increment data '0', to the microprocessor 10 through the keyboard 12. The microprocessor 10 supplies these data to the ramp signal generating circuit 14 via the interface 16.

In FIG. 2, the ramp start value 'a' from the interface 18 is supplied to the adders 20, 22, 24 and 26. The start value modification control means 28 generates start value modification values '2x', '3x', '0', 'x' according to ramp increment data 'x' and ramp start pixel address '6', and supplies the start value modification values '2x', '3x', '0', 'x' to the adders 20, 22, 24 and 26, respectively. The bit shift controller 48 multiplies the ramp increment data 'x' by '4'. The ramp start controller 46 controls the switch 60 of the accumulators 38, 40, 42 and 44 in order that the added ramp start values are loaded From the registers 30, 32, 34 and 36 into the registers 58 (FIG. 3) when the count value equals the video line address and the pixel address designated. On the next clock cycle, the adder 62 adds the non-inverted signal of the bit shift controller 48 to the output signal from the register 58. The switch 60 then supplies the output signal of the adder 62 to there register 58 under control of the ramp start controller 46. This accumulating operation is continued until the count value reaches the ramp end pixel address (on a next ramp start pixel address). When the count value reaches the ramp end address, the next ramp start value 'i' from the interface 18 is supplied to the adders 20, 22, 24 and 26. The start value modification control means 28 generates start value modification values '0', '0', '0', '0' according to the next ramp increment data '0' and the next ramp start pixel address '14', and supplies the start value modification values '0', '0', '0', '0' to the adders 20, 22, 24 and 26. The bit shift multiplier 48 multiplies the next ramp increment data '0' by '4'. Then the ramp start controller 46 controls the switch 60 of the accumulators 38, 40, 42 and 44 in order that the next added ramp start values are loaded from the registers 30, 32, 34 and 44 into the register 58, when the count value equals the next pixel address '14'. On the next clock cycle, the adder 62 adds the non-inverted signal of the bit shift controller 48 to the output signal from the re register 58. The switch 60 then supplies the output signal of the adder 62 to the register 58 under control of the ramp start controller 46. This accumulating operation is continued until the count value reaches the next ramp start pixel address.

Thus phase 0 output signal values 'c=a+2x', 'g=c+4x' and 'i' are sequentially outputted from the accumulator 38. Phase 1 output signal values 'd=a+3x', h=d+4x' and 'i' are sequentially outputted from the accumulator 40. Phase 2 output signal values 'a=a+0', e=a+4x' and 'i' are sequentially outputted from the accumulator 42. Phase 3 output signal values 'b=a+x', 'f=b+4x' and 'i' are sequentially outputted from the accumulator 44. Then these output signals from the accumulators 38, 40, 42 and 44 are combined by a combiner 68, so as to generate the ramp signal represented by the solid-line S.

In another case, if the operator inputs the following data through the keyboard 12 to the microprocessor 10, a signal such as a color bar signal T as indicated in FIG. 5 can be generated by the signal generating circuit 14. A first set of data are a video line address 'm', a start value '1', a start pixel address '0', and ramp increment data '0'. A second set of data are a video line address 'm', a start value 'g', a start pixel address '2', and ramp increment data '0'. A third set of data are a video line address 'm', a start value 'e', a start pixel address '4', and a ramp increment data '0'. A fourth set of data are a video line address 'm', a start value 'c', c start pixel address '6', and ramp increment data '0'. A fifth set of data are a video line address 'm', a start value 'a', a start pixel address '8', and ramp increment data '0'.

If the operator inputs the following data through the keyboard 12 to the microprocessor 10, a saw tooth signal U as indicated in FIG. 6 can be generated by the signal generating circuit 14. A first set of data are a video line address 'm', a start value 'a', a start pixel address '1', and ramp increment data 'x/2'. A second set of data are a video line address 'm', a start value 'a', a start pixel address '9', and ramp increment data 'x/2'.

If the operator inputs the following data through the keyboard 12 to the microprocessor 10, a signal V as indicated in FIG. 7 can be generated by the signal generating circuit 14. A first set of data are a video line address 'm', a start value 'a', a start pixel address '1', and ramp increment data '2x'. A second set of data are a video line address 'm' a start value 'd', a start pixel address '5', and ramp increment data 'x'. A third set of data are a video line address 'm', a start value 'c', a start pixel address '9', and ramp increment data 'x/2'. A fourth set of data are a video line address 'm', a start value 'a', a start pixel address '13', and ramp increment data '2x'. A fifth set of data are a video line address 'm' a start value 'a', a start pixel address '17', and ramp increment data '0'. The ramp signal so generated may be used as a key signal in a DME device, and allows keys to be generated with fully anti-aliased edges.

The output signals of the accumulators 38, 40, 42 and 44 may be further processed into a multiplexed channel by the combiner 68 (FIG. 2). Alternatively with higher speed processing the required video signal can be generated without the demultiplexing described, with consequent hardware saving, and likewise demultiplexing may not be necessary where the video signal is for a standard (not high definition) television signal.

Thus the embodiment can generate a range of required video signals with complete control over the start and end values and the gradients. By executing a sequence of ramps and flat portions on a video line by line basis, a required video signal can be constructed. Anti-aliased DME keys may be produced by generating ramps with critical gradients at key edges. Moreover, the hardware construction is simple.

When using a demultiplexed signal generating apparatus as described, fop example with four signal paths (phase 0, phase 1, phase 2, phase 3), the data processing can be carried out at a quarter clock rate on four demultiplexed component signals. Therefore it is possible to generate a signal for a high definition video system at a relatively low clock Fate.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirit of the invention as defined by the appended claims.

We claim:

1. A video signal generating apparatus comprising:
   input means for inputting data relating to a video signal to be generated and representing signal pixel start addresses, signal start levels at said signal start addresses, and signal increment values;
   a plurality of adder means for adding modification levels to said signal start levels for respective video outputs;
   start value modification control means for generating a number of said modification levels, the number of said modification levels corresponding to the number of said adder means;
   a plurality of accumulator means for accumulating the output signals of said adder means from said signal start addresses in dependence on said signal increment values, so as to generate demultiplexed video signals; and
   combiner means for combining the demultiplexed signals so to generate said video signal.

2. Apparatus according to claim 1 wherein said input means inputs up/down data representing a polarity of the signal increment value.

3. Apparatus according to claim 1 wherein each said accumulator means and each said adder means operates at 1/n clock rate, where n is the number of said adder means.

4. Apparatus according to claim 1 further comprising:
   signal start control means for generating an accumulation start trigger signal according to said signal start address and a count value; and
   signal increment value generating means for generating signal increment values by multiplying the signal increment value by n (where n is the number of adder means), said accumulator means accumulating output signals of said adder means from said signal start address in dependence on said signal increment value and an accumulation start trigger signal so as to generate demultiplexed signals.

5. Apparatus according to claim 4 wherein each said accumulator means includes register means for memorizing data, inverting means for inverting a polarity of the output signal of the signal increment value generating means, first switch means for selectively outputting the output signal of said signal increment value generating means and the output signal of said inverting means in dependence on an up/down signal, adding means for adding the output signal of said first switch means to the output signal of said register means, and second switch means for selectively supplying the output signals of said adding means and the output signal of said adder means to said register means in dependence on said accumulation start trigger signal.

6. Apparatus according to claim 2 further comprising:
   signal start control means for generating an accumulation start trigger signal according to said signal start address and a count value; and
   signal increment value generating means for generating signal increment values by multiplying the signal increment data by n (where n is the number of adder means), said accumulator means accumulating output signals of said adder means from said signal start address in dependence on said signal increment value and an accumulation start trigger signal so as to generate demultiplexed signals.

7. Apparatus according to claim 6 wherein each said accumulator means includes register means for memorizing data, inverting means for inverting the polarity of the output signal of the signal increment value generating means, first switch means for selectively outputting the output signal of said signal increment value generating means and the output signal of said inverting means in dependence on an up/down signal, adding means fop adding the output signal of said first switch means to the output signal of said register means, and second switch means for selectively supplying the output signals of said adding means and the output signal of said adder means to said register means in dependence on said accumulation start trigger signal.

* * * * *